Nov. 9, 1926.

G. W. PETERSON

STARTING DEVICE

Filed Nov. 14, 1925  2 Sheets-Sheet 1

1,606,663

G. W. Peterson, INVENTOR

BY *Victor J. Evans*

ATTORNEY

WITNESS:

Nov. 9, 1926.
G. W. PETERSON
STARTING DEVICE
Filed Nov. 14, 1925
1,606,663
2 Sheets-Sheet 2
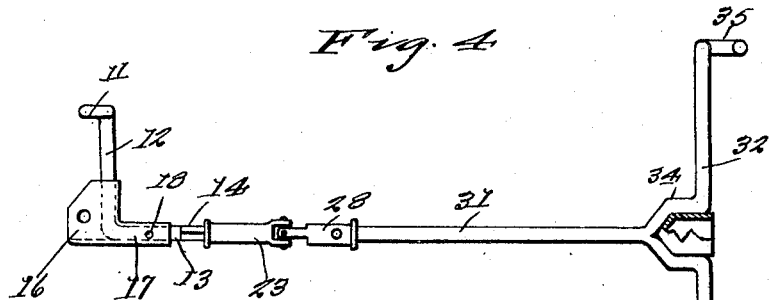
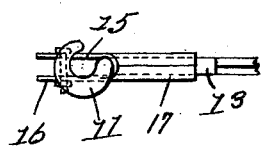
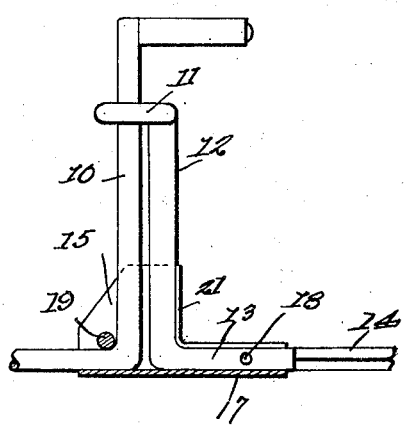
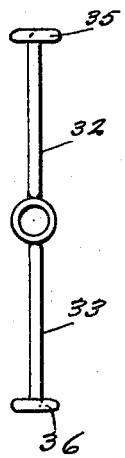
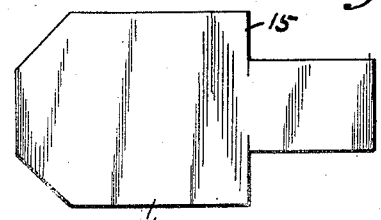
G.W. Peterson INVENTOR
BY *Victor J. Evans*
ATTORNEY
WITNESS:

Patented Nov. 9, 1926.

1,606,663

UNITED STATES PATENT OFFICE.

GEORGE WILFRED PETERSON, OF GARY, INDIANA.

STARTING DEVICE.

Application filed November 14, 1925. Serial No. 69,131.

The object of this invention is to provide a starting device, especially useful in starting the engine of any tractor having a crank for this purpose on the front of the machine. A further object is to provide means for connection with a wheel of a motor vehicle and adapted to extend to the crank of the tractor, said means including relatively slidable elements, a universal joint, and special means for effecting connections directly with the starting crank.

With the foregoing and other objects in view, the invention consists in the novel construction and arrangement of elements described, illustrated and claimed, it being understood that modifications may be made within the scope of the claim, without departing from the spirit of the invention.

In the drawings forming part of this application,

Figure 4 shows the device in elevation, the elements at the left being detached from the crank shown in Figure 1, and the element at the right of Figure 4 being detached from the wheel of the car illustrated in Figure 1 as being in position for applying power.

Figure 5 is a view of the structure at the left of Figure 4, when looking from above.

Figure 6 is a view on an enlarged scale, partly in sections, showing the devices for connecting the attachment directly with the crank.

Figure 7 shows the element to be attached directly to the wheel, as it appears when looking from the right in Figure 4.

Figure 8 is a plan view of a blank sheet of metal from which the crank holding device is produced.

Figure 1:
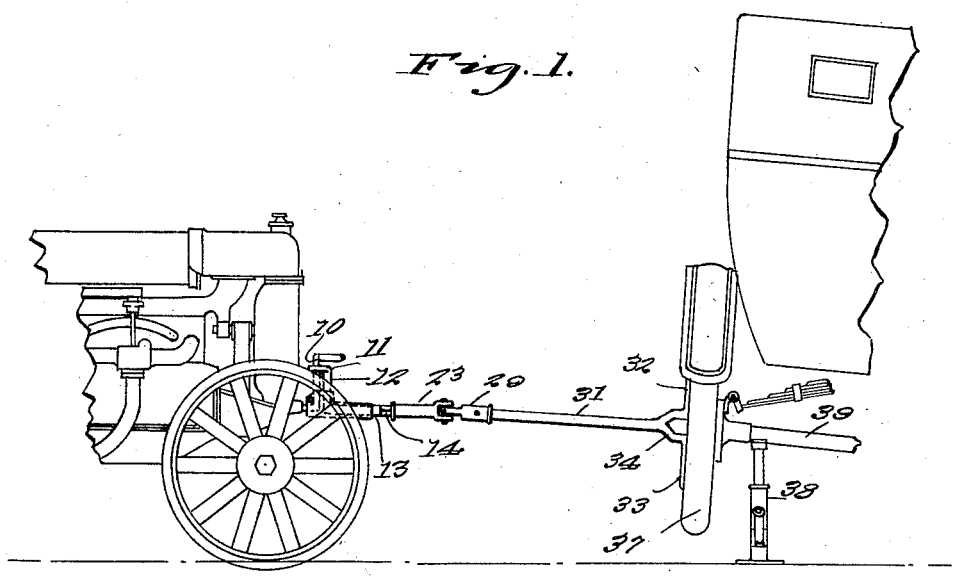
Figure 1 shows the front portion of a tractor, in side elevation, and shows in elevation, the means employed for connecting the starting crank with the wheel of a motor vehicle.

A portion of the tractor is shown conventionally in Figure 1, and the crank 10 thereof occupies the usual position, and operates in the usual manner. Engaging the crank 10 is a hook-portion 11, this element being off-set from arm 12 which in turn is off-set from shaft member 13, the latter having an end portion 14 square or angular in cross section.

The manner of connecting shaft member 14 and the deflected portion 12, with the crank is important, and the means employed include a crank holder comprising oppositely located plates 15 and 16 which may be formed in one piece with the tubular portion 17 connected with shaft member 13 by means of bolt or pin 18. A bolt 19 passes through elements 15 and 16, and a type of clamp is provided, the jaws of which catch on opposite sides of the crank 10, and are slidable to position before the bolt 19 is slipped into place. The crank holder may be considered as including a tubular portion and a channelled portion, the web of the channel being shown at 21 in Figure 6.

Cooperating with the angular portion 14 of member 13, is a square tubular member 23, or a member having a square or angular bore, the end 24 of which is open, and the opposite end of element 23 including a solid portion 25, and a fork 26.

Figure 2:
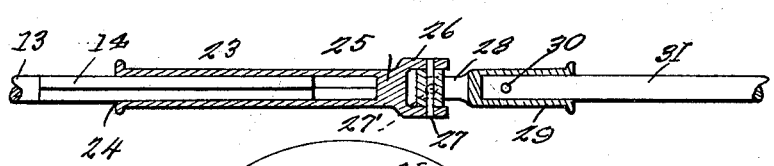
Figure 2 is a view in longitudinal section showing the relatively slidable elements, and the manner in which one of these elements is connected by a universal joint with a rod or shaft designed to carry elements for direct connection with the wheels of the car to be used for applying power.

A pin 27 passes through the fork, and transverse device or devices 27' permit universal movement with reference to the member 28 constituting an end portion of member 29 which is connected by pin 30 with the shank of rod 31, which however may be termed a shaft member adapted to operate in approximate alignment with the shaft element at the left of Figure 2. Carried by rod or shaft 31 are laterally extending elements 32 and 33 shown specially in Figure 4, and having their inner portions deflected at 34 in order to pass around the hub of the wheel to which the fork device now being described is to be applied.

Figure 3:
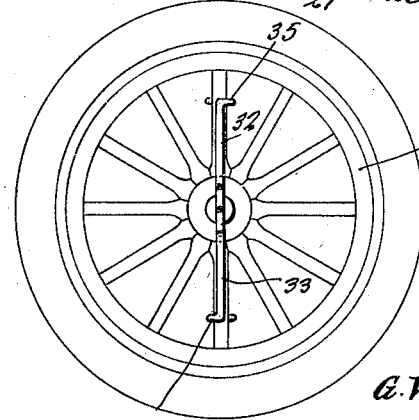
Figure 3 is a view in elevation, showing the manner of connecting a forked device with the spokes of a wheel, for imparting the starting movement.

The outer ends of elements 32 and 33 are deflected in opposite directions to form hooks 35 and 36, these hooks being adapted for engagement with the spokes of a wheel 37, in the manner shown in Figure 3.

A jack 38 will be placed under the axle 39 of the car applying power, and when the connections are made as shown in Figure 1, the required movement will be given to the crank of the tractor. Upon starting, the crank releases and relative movement takes place between the longitudinally slidable elements, in an obvious manner.

The device is especially useful for starting machines in cold weather, and when they are difficult to start for other reasons, assuming that the difficulty depends on effective cranking.

What is claimed is:

A device of the class described, comprising a plurality of relatively slidable members, one of which is deflected to form a crank engaging hook, means for connection with a driven wheel, a universal joint between one of the slidable elements and said means, and a crank holding attachment connected with the other slidable element and including a plate member deflected around one of the relatively slidable members, longitudinally thereof, and also including a perpendicular extension deflected around the shank portions of the crank and crank engaging hook, and devices extending transversely of the plate member so deflected and engaging respectively the crank and one of the relatively slidable members.

In testimony whereof I affix my signature.

GEORGE WILFRED PETERSON.